United States Patent Office 2,860,131
Patented Nov. 11, 1958

2,860,131

BENZIMIDAZOLE DERIVATIVES

Karl Folkers, Plainfield, and Clifford Shunk, Westfield, N. J., assignors to Merck & Co., Inc., Rahway, N. J., a corporation of New Jersey No Drawing. Application May 5, 1953
Serial No. 353,224

7 Claims. (Cl. 260—211.5)

This invention relates to the preparation of the new chemical compounds, 5,6-dihalo-1-D-ribofuranosylbenzimidazole, and acid salts thereof. It is also concerned with the preparation of the novel chemical compounds, 1-halomercuri-5,6-dihalobenzimidazole and 5,6-dihalo-1-(triacyl-D-ribofuranosyl)-benzimidazole, produced as intermediates in the synthesis of 5,6-dihalo-1-D-ribofuranosylbenzimidazole.

Certain compounds of this invention possess marked and effective anti-viral activity against Influenza B virus. For example, 5,6-dichloro-1-D-ribofuranosylbenzimidazole has ninety-two times the inhibitory action of benzimidazole against Influenza B virus when tested in accordance with the method later described. A number of substituted benzimidazoles outside the scope of this invention have also been tested for activity against Influenza B virus and have been found to have little inhibitory activity.

The compositions of this invention are prepared by reacting a 5,6-dihalobenzimidazole having the following formula:

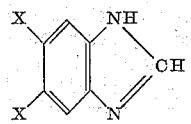

wherein X represents a halogen atom, with a mercuric halide to produce the new 1-halomercuri-5,6-dihalobenzimidazoles, having the following formula:

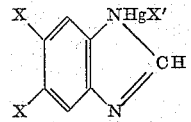

wherein X and X' represent halogen atoms and X and X' need not be the same halogen atom.

The 1-halomercuri-5,6-dihalobenzimidazoles are next reacted with a 1-halo-2,3,5-triacyl-D-ribofuranose having the formula

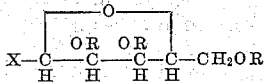

wherein X represents a chlorine or bromine atom and R represents a lower acyl radical. The new compounds formed in this reaction are 5,6-dihalo-1-(triacyl-D-ribofuranosyl)-benzimidazoles, and have the formula

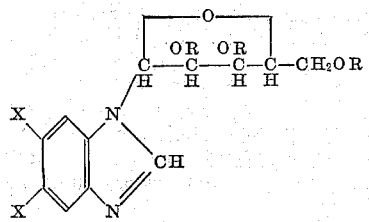

The 5,6-diahalo-1-(triacyl-D-ribofuranosyl)-benzimidazoles are then hydrolyzed to form the 5,6-dihalo-1-D-ribofuranosylbenzimidazoles, which are new compounds and have the formula

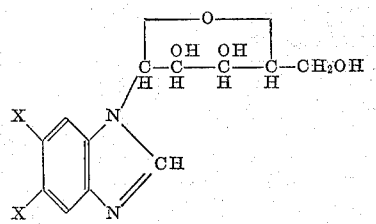

The 5,6-dihalo-1-D-ribofuranosylbenzimidazole acid salts are prepared by reacting 5,6-dihalo-1-D-ribofuranosylbenzimidazole with an acid in aqueous or alcoholic solution. The salt may be isolated by removal of solvent under reduced pressure. Acid salts, such as the 5,6-dihalo-1-D-ribofuranosylbenzimidazole hydrochloride, 5,6-dihalo-1-D-ribofuranosylbenzimidazole hydrobromide, 5,6-dihalo-1-D-ribofuranosylbenzimidazole sulfate, 5,6-dihalo-1-D-ribofuranosylbenzimidazole citrate and 5,6-dihalo-1-D-ribofuranosylbenzimidazole acetate, may be prepared in this manner.

One of the starting materials, the 5,6-dihalobenzimidazole, employed in this invention can be prepared by reacting 4,5-dihalo-1,2-diaminobenzene with anhydrous formic acid at reflux temperature.

The 1-halo-2,3,5-triacyl-D-ribofuranose employed as an intermediate in this process may be prepared by reacting tetraacyl-D-ribofuranose with a halogen halide.

In accordance with a preferred embodiment of this invention, 5,6-dichlorobenzimidazole is reacted with mercuric chloride in an inert solvent in the presence of an alkali metal base or alkaline earth metal base to form 1-chloromercuri-5,6-dichlorobenzimidazole. It has been found that the time and temperature of the reaction are not critical, although elevated temperatures accelerate the reaction. Any inert liquid medium in which the reactants are soluble but the reaction product is insoluble may be utilized as a medium in the reaction of 5,6-dichlorobenzimidazole and mercuric chloride. Water or lower alkanols, for example, ethanol, propanol, butanol, and amyl alcohol, may be used. Suitable alkali metal bases or alkaline earth metal bases which may be employed in the process include sodium hydroxide, potassium hydroxide, calcium hydroxide, sodium carbonate, potassium bicarbonate, and the like. It is preferred to use about one equivalent of base to bind the free acid liberated in the reaction.

The 1-chloromercuri-5,6-dichlorobenzimidazole is then reacted with 1-chloro-2,3,5-triacyl-D-ribofuranose in the presence of a solvent, and 5,6-dichloro-1-(triacyl-D-ribofuranosyl)-benzimidazole recovered. Compounds such as 1-chloro-2,3,5-triacetyl-D-ribofuranose, 1-bromo-2,3,5-triacetyl-D-ribofuranose, 1-chloro-2,3,5-tripropionyl-D-ribofuranose, 1-chloro-2,3,5-tributyryl-D-ribofuranose or 1-chloro-2,3,5-tribenzoyl-D-ribofuranose may be employed. Examples of suitable solvents for the reaction are benzene, toluene and xylene. Xylene is the preferred solvent for the reaction since the reflux temperature of xylene provides a convenient reaction temperature.

To produce the 5,6-dichloro-1-D-ribofuranosylbenzimidazole, the 5,6-dichloro-1-(triacyl-D-ribofuranosyl)-benzimidazole is hydrolyzed. The hydrolysis may be carried out in either an alkaline or acid medium. In accordance with the preferred procedure, 5-6-dichloro-1-(triacyl-D-ribofuranosyl)-benzimidazole is hydrolyzed with methyl alcohol in the presence of anhydrous ammonia. Anhydrous conditions are preferred for this reaction. Ammonia is also preferred since it is readily removed from the reaction mixture. Lower alkanols, such as methanol, ethanol, propanol and isopropanol, may be employed as solvents. If desired, acid hydrolysis may be conducted employing aqueous alcoholic solutions containing a hydrohalic acid.

The 5,6-dichloro-1-D-ribofuranosylbenzimidazole acid salts are prepared by reacting 5,6-dichloro-1-D-ribofuranosylbenzimidazole with an acid in aqueous or alcoholic solution. The salt may be isolated by removal of solvent under reduced pressure.

5,6-Dichloro-1-D-ribofuranosylbenzimidazole and closely related compounds were tested for antiviral activity against Influenza B virus as follows:

Groups of six chorio-allantoic membranes, the membrane from an embryonated egg which serves as a source of living cells, were quartered and each quarter placed in a separate tube containing 0.9 ml. of a nutrient fluid comprising saline, glucose and salts. Each of these tubes was inoculated with Lee Influenza B virus diluted ten thousand times in a similar nutrient fluid, 0.1 ml. of the virus solution per tube. To each group of six inoculated tubes was added one of the compounds listed in Table I below. After thirty-six hours, hemagglutination titrations were carried out on the individual samples using a 0.25% concentration of chicken erythrocytes in solution. The geometric mean titer of each group was then computed.

The concentration of each benzimidazole derivative necessary to give 75% inhibition of viral multiplication was determined. The comparative activity of benzimidazole derivatives is given below.

The number of the position of the substituents in each of the compounds as given in the table is indicated in the following formula:

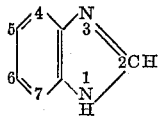

TABLE I

| | Inhibition rate |
|---|---|
| 5-methylbenzimidazole | 1.9 |
| 5,6-dimethylbenzimidazole | 1.9 |
| 2,5-dimethylbenzimidazole | 2.6 |
| 2-propyl-5-methylbenzimidazole | 14.3 |
| 2-ethyl-5-methylbenzimidazole | 19.2 |
| 2,4,5,6,7-pentamethylbenzimidazole | 16.3 |
| 2-isopropyl-5-methylbenzimidazole | 20.6 |
| 5,6-dichloro-1-D-ribopyranosylbenzimidazole | 15.2 |
| 5,6-dichloro-2-methyl-1-D-ribofuranosyl-benzimidazole | 15.0 |
| 5,6-dichloro-1-D-ribofuranosylbenzimidazole | 92.0 |

A number of other benzimidazoles mono, di, and tri-methylated at positions 2, 4, 5 and 6 were less than six times as active as benzimidazole.

The following example illustrates a method of carrying out the present invention, but it is to be understood that this example is given primarily by way of illustration and not of limitation.

*Example*

PREPARATION OF 1-CHLOROMERCURI-5,6-DICHLORO-BENZIMIDAZOLE

Five and seven-tenths grams, of 5,6-dichlorobenzimidazole, prepared as described hereinafter, was dissolved in 120 ml. of hot 50% ethyl alcohol and 33 ml. of 1 N sodium hydroxide was added. A hot solution of 8.1 grams of mercuric chloride in 100 ml. of ethyl alcohol (95%) was then added to the reaction mixture with stirring. The gel which formed became grainy after heating with stirring for about twenty minutes. The 1-chloromercuri-5,6-dichlorobenzimidazole which was collected, washed with hot water and dried in vacuo over potassium hydroxide, weighed 12.0 grams. Chlorine analysis: $C_7H_3N_2Cl_3Hg$. Calculated: 9.30. Found: 9.55.

In a similar manner, 5,6-dibromobenzimidazole may be substituted for 5,6-dichlorobenzimidazole, and mercuric bromide might be substituted for mercuric chloride to form the 1-bromomercuri-5,6-dibromobenzimidazole or 1-bromomercuri-5,6-dichlorobenzimidazole in the above reaction.

PREPARATION OF 5,6-DICHLORO-1-(TRIACETYL-D-RIBOFURANOSYL)BENZIMIDAZOLE 1-chloro-2,3,5-triacetyl-D-ribofuranose was prepared by suspending 9.87 grams of tetraacetyl-D-ribofuranose in about 200 ml. of dry ether and saturating the mixture with dry hydrogen chloride at 0° C. The resulting solution was maintained at 0° C. for four days. The solution was then concentrated in vacuo to an oil under anhydrous conditions. Several portions of dry benzene were added to the oil and evaporated to remove the hydrogen chloride, and the 1-chloro-2,3,5-triacetyl-D-ribofuranose was recovered.

A suspension of 13.2 grams of 1-chloromercuri-5,6-dichlorobenzimidazole in one liter of dry xylene was refluxed with stirring and 1-chloro-2,3,5-triacetyl-D-ribofuranose dissolved in 50 ml. of xylene was added to this suspension. The mixture was refluxed gently with stirring for four hours, cooled, and the crude 5,6-dichloro-1-(triacetyl-D-ribofuranosyl)-benzimidazole which precipitated was collected and dried, weight being 11.74 grams. The filtrate was diluted with three liters of petroleum ether (boiling point 30°–50° C.) to yield 9.17 grams of crude amorphous 5,6-dichloro-1-(triacetyl-D-ribofuranosyl)-benzimidazole. The first precipitate was extracted with several portions of warm chloroform. The extracts were combined and the second precipitate was added. The resulting chloroform solution was filtered, washed with 30% potassium iodide solution and then with water and dried over anhydrous magnesium sulfate. After filtering off the drying agent, the chloroform was evaporated leaving 11.4 grams of 5,6-dichloro-1-(triacetyl-D-ribofuranosyl)-benzimidazole as a colorless to light yellow oil.

In a manner similarly described in the above reaction, 1-bromo-2,3,5-triacetyl-D-ribofuranose, 1-chloro-2,3,5-tripropionyl-D-ribofuranose, 1-chloro-2,3,5-tributyryl-D-ribofuranose or 1-chloro-2,3,5-tribenzoyl-D-ribofuranose may be substituted for 1-chloro-2,3,5-triacetyl-D-ribofuranose to form 5,6-dihalo-1-(triacyl-D-ribofuranosyl)-benzimidazoles, such as 5,6-dibromo-1-(triacetyl-D-ribofuranosyl)-benzimidazole, 5,6-dibromo-1-(tripropionyl-D-ribofuranosyl)-benzimidazole, 5,6-dichloro-1-(tributyryl-D-ribofuranosyl)-benzimidazole and 5,6-dibromo-1-(tribenzoyl-D-ribofuranosyl)-benzimidazole.

PREPARATION OF 5,6-DICHLORO-1-D-RIBOFURANOSYL-BENZIMIDAZOLE

Eleven and four-tenths grams of 5,6-dichloro-1-(triacetyl-D-ribofuranosyl)-benzimidazole dissolved in 120 ml. of methanol was added to 250 ml. of methanol containing 65 grams of anhydrous ammonia at 0° C. The solution was kept in the refrigerator overnight. Concentration of the solution under reduced pressure resulted in a yellow-tinted crystalline solid, 5,6-dichloro-1-D-ribofuranosylbenzimidazole, which was recrystallized from an ethyl alcohol-water mixture to yield a product melting at 221–224° C. A second recrystallization resulted in 5,6-dichloro-1-D-ribofuranosylbenzimidazole, having a melting point of 224–225° C.

*Analysis.*—Calculated for $C_{12}H_{12}Cl_2N_2O_4$: C, 45.16; H, 3.79; N, 8.78. Found: C, 45.51; H, 3.63; N, 9.09.

5,6-dibromo-1-(triacetyl-D-ribofuranosyl)-benzimidazole, 5,6-dibromo-1-(tripropionyl-D-ribofuranosyl)-benzimidazole, 5,6-dichloro-1-(tributyryl-D-ribofuranosyl)-benzimidazole or 5,6-dibromo-1-(tribenzoyl-D-ribofuranosyl)-benzimidazole may be substituted for 5,6-dichloro-1-(triacetyl-D-ribofuranosyl)-benzimidazole in the above reaction to form the corresponding 5,6 - dibromo - 1 - D - ribofuranosylbenzimidazole and 5,6-dichloro-1-D-ribofuranosylbenzimidazole.

PREPARATION OF 5,6-DICHLORO-1-D-RIBOFURANOSYL-BENZIMIDAZOLE HYDROCHLORIDE 5,6 - dichloro - 1 - D - ribofuranosylbenzimidazole hydrochloride may be prepared by dissolving 5,6-dichloro-1-D-ribofuranosylbenzimidazole in water or aqueous alcohol, adding hydrochloric acid to the reaction mixture and removing the solvent under reduced pressure to form 5,6-dichloro-1-D-ribofuranosylbenzimidazole hydrochloride.

The 5,6-dichlorobenzimidazole employed as a starting material in this example was prepared as follows: 4,5-dichloro-1,2-diaminobenzene was added to anhydrous formic acid and the mixture refluxed for approximately five hours. The 5,6-dichlorobenzimidazole was recovered.

Modifications may be made in carrying out the present invention without departing from the spirit and scope thereof and the invention is to be limited only by the appended claims.

What is claimed is:
1. A compound of the formula

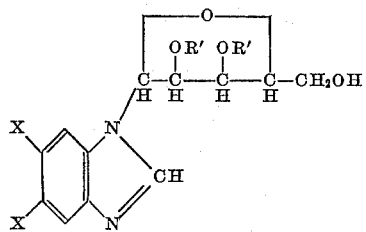

and acid salts thereof, wherein X is halogen and R' is selected from the group consisting of hydrogen and a lower acyl radical.

2. 5,6 - dihalo - 1 - (triacyl - D - ribofuranosyl) - benzimidazole.
3. 5,6 - dichloro - 1 - (triacetyl - D - ribofuranosyl)-benzimidazole.
4. 5,6-dihalo-1-D-ribofuranosylbenzimidazole.
5. 5,6-dihalo-1-D-ribofuranosylbenzimidazole acid salts.
6. 5,6-dichloro-1-D-ribofuranosylbenzimidazole.
7. 5,6 - dichloro - 1 - D - ribofuranosylbenzimidazole acid salts.

References Cited in the file of this patent
UNITED STATES PATENTS

| | | |
|---|---|---|
| 2,065,418 | Andersag et al. | Dec. 22, 1936 |
| 2,409,685 | Jones et al. | Oct. 22, 1946 |
| 2,522,854 | Brink et al. | Sept. 19, 1950 |
| 2,606,187 | Hoffman | Aug. 5, 1952 |
| 2,662,883 | Holly et al. | Dec. 15, 1953 |
| 2,719,843 | Davoll et al. | Oct. 4, 1955 |

OTHER REFERENCES

Weygand et al.: Chem. Abst., vol. 45, page 6683 (1951).